(12) United States Patent
Pasvandi

(10) Patent No.: US 9,382,782 B2
(45) Date of Patent: Jul. 5, 2016

(54) HYDROMECHANICAL SLOT PERFORATOR (VARIANTS)

(71) Applicant: PASSERBY INC, Mahe (SC)

(72) Inventor: Marie Pasvandi, Mesa Geitona (CY)

(73) Assignee: Passerby Inc., Providence, Mahe (SC)

( * ) Notice: Subject to any disclaimer, the term of this patent is extended or adjusted under 35 U.S.C. 154(b) by 106 days.

(21) Appl. No.: 14/358,095

(22) PCT Filed: Nov. 28, 2012

(86) PCT No.: PCT/IB2012/002517
§ 371 (c)(1),
(2) Date: May 14, 2014

(87) PCT Pub. No.: WO2013/088215
PCT Pub. Date: Jun. 20, 2013

(65) Prior Publication Data
US 2014/0311729 A1  Oct. 23, 2014

(30) Foreign Application Priority Data
Nov. 28, 2011  (RU) ................................ 2011148310

(51) Int. Cl.
*E21B 43/112* (2006.01)
*E21B 29/06* (2006.01)
*B23D 21/14* (2006.01)

(52) U.S. Cl.
CPC ............... *E21B 43/112* (2013.01); *E21B 29/06* (2013.01); *B23D 21/14* (2013.01); *Y10T 83/398* (2015.04)

(58) Field of Classification Search
CPC ...... E21B 43/112; B23D 21/14; Y10T 83/398
See application file for complete search history.

(56) References Cited

U.S. PATENT DOCUMENTS

| | | | | |
|---|---|---|---|---|
| 682,180 A | * | 9/1901 | Eastwood | E21B 43/112 166/55.2 |
| 808,235 A | * | 12/1905 | Graham | E21B 43/112 166/55.3 |
| 1,125,513 A | * | 1/1915 | Graham | E21B 43/112 166/55.3 |
| 1,500,830 A | * | 7/1924 | Layne | E21B 43/112 166/55.2 |
| 2,116,465 A | * | 5/1938 | Patterson | E21B 43/112 166/55.3 |
| RE21,824 E | * | 6/1941 | Lowrey | E21B 29/005 166/298 |

(Continued)

FOREIGN PATENT DOCUMENTS

| | | | | |
|---|---|---|---|---|
| RU | WO 2004111385 A1 | * | 12/2004 | ............ E21B 43/112 |
| RU | 2348797 C1 | * | 3/2009 | ............ E21B 43/112 |
| RU | 2371569 C1 | * | 10/2009 | ............ E21B 43/112 |

*Primary Examiner* — Shane Bomar
(74) *Attorney, Agent, or Firm* — Aleksandr Smushkovich

(57) ABSTRACT

The proposed hydro-mechanical slot perforator for well drilling is a device designed for opening productive formations in at least two projections forming high quality slots. The perforator includes a casing, housing a piston-pusher, and a cutting assembly, located below the piston-pusher, including extendable cutting tools and a mechanism for extending thereof, formed as a double-arm (lower and upper) lever (or a balance beam), whose arms hold the cutting tools. A deflecting wedge is mounted on a mobile shaft under the lever. The shaft rotates when the lower arm interacts with the wedge, while the piston-pusher moves down. The piston-pusher is designed as a wedge-piston acting on the upper arm, extending the top cutting tools out, resulting in the wedge-piston and the deflecting wedge creating oppositely directed forces acting simultaneously upon the upper and lower arms. Another embodiment is proposed where an augmented cutting assembly includes more than two cutting tools.

6 Claims, 2 Drawing Sheets

(56) References Cited

U.S. PATENT DOCUMENTS

| | | | | |
|---|---|---|---|---|
| 2,638,165 A | * | 5/1953 | Barber | E21B 43/112 166/212 |
| 4,220,201 A | * | 9/1980 | Hauk | E21B 29/00 166/55.2 |
| 2008/0178721 A1 | * | 7/2008 | Schwindt | B23D 11/00 83/191 |

* cited by examiner

HYDROMECHANICAL SLOT PERFORATOR (VARIANTS)

CROSS-REFERENCE TO RELATED APPLICATIONS

This application is a U.S. national stage application of a PCT application PCT/IB2012/002517 filed on 28 Nov. 2012, published as WO/2013/088215, whose disclosure is incorporated herein in its entirety by reference, which PCT application claims priority of a Russian Federation patent application RU2011148310 filed on 28 Nov. 2011.

FIELD OF TECHNOLOGY

The proposed group of inventions relates to the drilling and well operations, in particular to the design of devices for the opening of productive formations by hydro-mechanical slot perforation, and can be used in construction and maintenance of producing wells of various types.

BACKGROUND OF THE INVENTION

There are known devices for slot perforation of wells in the prior art that allow to simultaneously form at least two perforation slots in the production column, for example, as disclosed in the patents RU 2249678 C2, IPC E21B 43/112, 10.04.2005, RU 2371569 C1, IPC E21B 43/112, 27.10.2009, RU 2365743 C1, IPC E21B 43/112, 27.08.2009. The size of the cutting tools used in the above designs' cutting assemblies is close to the diameter of the casing of the perforator device, allowing to make perforation slots with considerable depth.

The disadvantage presented by this device consists in its applying a non-uniform force to the cutting discs, where one of the discs is driven directly by the extending mechanism having the form of a wedge-piston or a deflecting wedge, while the second disc is driven indirectly by a lever from the first blade which may have the shape of a balance-beam. In this case, the first cutting disc, which receives the driving effort directly, travels the maximum distance into the rock, while the second disc, located above or below the first one, is less effective resulting in the second slot potentially not reaching the required width or depth, and in case of a prolonged operation of the perforator and of the disc blade being in a substantially deteriorated condition the second slot may not appear at all.

The objective of the proposed invention is to equalize the effort applied to the cutting blades of a double-sided perforator in order to provide for uniform opening of the production column simultaneously in at least two projections to ensure that diametrical slots of the equally high quality are created.

The closest analogue to the proposed invention is the perforation device disclosed in the patent RU 2365743 C1, IPC E21B 43/112, 27.08.2009, which is assumed as a prototype.

The prototype device comprises a casing containing a spring-loaded piston-pusher with an axial central channel and two lateral radial channels with jet nozzle installed in them, and a retractable cutting tool in the form of two rolling discs, mounted one above the other, with the mechanisms for their radial extension and retraction, which includes a double-arm lever mounted on a movable central axis between two vertical rods mounted on a fork rigidly attached to the bottom edge of the piston-pusher, having the cutting discs installed on hinges at the arms of the said lever, and a fixed deflection wedge mounted on the bottom of the casing with a given angle of the working surface to the axis of the device and a guiding slit for the lower cutting disc, that interacts with the lower double-arm lever's arm during the piston-pusher's axial movement, while the cutting discs' return mechanism is implemented as side plates with guiding grooves installed between the casing and the lower double-arm lever's arm in parallel with the working surface of the deflecting wedge, which houses the ends of the shaft of the lower cutting disc (with a clearance).

The prototype's design has the following drawbacks:
1. The effort supplied to the cutting discs is uneven: the piston's momentum is firstly transmitted to the lower cutting disc through the deflection wedge and only indirectly, through the double-arm lever, to the upper cutting disc.
2. The quality of perforation of the column by the cutting discs varies between the two of them.
3. The discs wear out unevenly resulting, in case of prolonged operations, in an increase of the rig-up and rig-down operations in order to have the cutting discs replaced.

SUMMARY OF THE INVENTION

The proposed invention provides for achieving the following technical results:
1. Improved uniformity, quality and speed of perforation of the production column, improved performance of the perforator.
2. Reducing the likelihood of fractures and deformations in the moving parts of the perforator.
3. Reducing the likelihood of jamming of the cutting tools in the slots being created.
4. Ensuring the even wearing out of cutting tools and reduction of their deterioration.
5. Increasing reliability of the perforator device It is also important to note that in achieving these technical results the design of the proposed device remains simple, ensuring the ease of manufacturing of such devices and the convenience of their operation.

This technical achievement results from equalizing the forces applied to the cutting tools of the perforator by implementing the piston-pusher in the shape of a wedge-piston with it being capable of directly acting on the upper arm of the double-arm lever which serves to extend the upper cutting tool out.

The first embodiment of the inventive device is a hydro-mechanical slot perforator comprising: a casing which houses a piston-pusher and a cutter assembly located below the piston, including extendable cutting tools with a mechanism for their extension having the form of a double-arm lever (balance beam), which houses the cutting tools in its arms, as well as a deflecting wedge mounted in a fixed position under the balance beam or allowing it to perform a slight movement, while the balance beam is mounted on a mobile shaft allowing it to rotate when its lower arm interacts with the deflecting wedge while the piston-pusher moves down. Moreover, according to the invention, the piston-pusher's design has the form of a wedge-piston with it being capable of acting directly on the upper arm of the double-arm lever which extends out the top cutting tool, and thus resulting in the wedge-piston and the deflecting wedge exerting more or less equal oppositely directed forces that act simultaneously on the upper and lower arms of the balance beam.

The second version of the device included in the proposed group of inventions is a hydro-mechanical slot perforator comprising a casing which houses a piston-pusher and, below the piston, a cutter assembly with extendable cutting tools and a mechanism for their extension including a deflecting wedge mounted inside the perforator's housing under the cutting assembly in a fixed manner or allowing it to move slightly.

According to the second embodiment of the invention, the piston-pusher is designed as a wedge-piston capable of directly acting on the cutter assembly, which includes at least two balance beams with cutting tools in their arms, with the said balance beams mounted on mobile shafts to interact and rotate under the force applied by the wedge-piston to the upper arm of the top balance beam and by the deflecting wedge to the lower arm of the bottom balance beam.

The second embodiment of the invention results in an enlarged cutter assembly containing more than two cutting tools which allows to further improve the performance of the perforator.

Both embodiments of the perforator may also include a mechanism to retract the extendable parts into the transport position comprising, for example, one or more guiding grooves on the balance beam(s), and one or more rods attached to the other balance beam, to the shaft of the other beam, to the piston-pusher, to the deflecting wedge, configured to allow movement along the groove(s) and thus ensuring the return of the balance beam(s) into the transport position with the piston-pusher's reverse movement. The presence of such a mechanism is desirable since it improves the performance of the perforator, facilitates its folding into the transport position and its extraction from the well upon completion of operations, and helps to avoid jamming and breaking of the cutting tools.

Both embodiments of the proposed invention allow to improve the performance and reliability of the perforator compared to the prototype.

Implementation of the piston-pusher as a wedge-shaped piston allows creating an extra effort applied to the top of the cutting assembly, opposed to the direction of the force generated by the deflecting wedge from below. The additional effort of the wedge-piston is applied to the mechanism extending the top cutting tools, resulting in an equalization of the forces applied to the top and bottom cutters, which ensures that the cutting tools penetrate the column in a uniform manner. This provides for evenness of their operation, prevents jamming and other accidents, and ensures they wear-out evenly. The implementation of this invention allows perforating a column in two projections in a guaranteed manner, achieving the same quality parameters for both slots in both projections.

The cutting tools proposed in both version of the device can be made in the form of discs (cutters), mounted on shafts, same as in the prototype, or they could have other shapes and forms (such as knives, chisels, etc.). Moreover, the cutting tools may be implemented directly on the balance beam(s), for example, through having the balance beam's edge treated to provide it with cutting properties, for example, by sharpening it or embedding carbide inserts in it.

Any of the perforator's embodiments can be fitted with two or more jet nozzles mounted, for example, in the perforator's casing and/or in its piston. This allows realizing the jet processing of the bottom-hole zone within the range of the perforation directly after opening the column without any additional equipment or extra rig-up/rig-down operations.

The claimed device has a simple design which ensures reliability and constructability thereof.

DESCRIPTION OF PREFERRED EMBODIMENTS OF THE INVENTION

Figure 1:
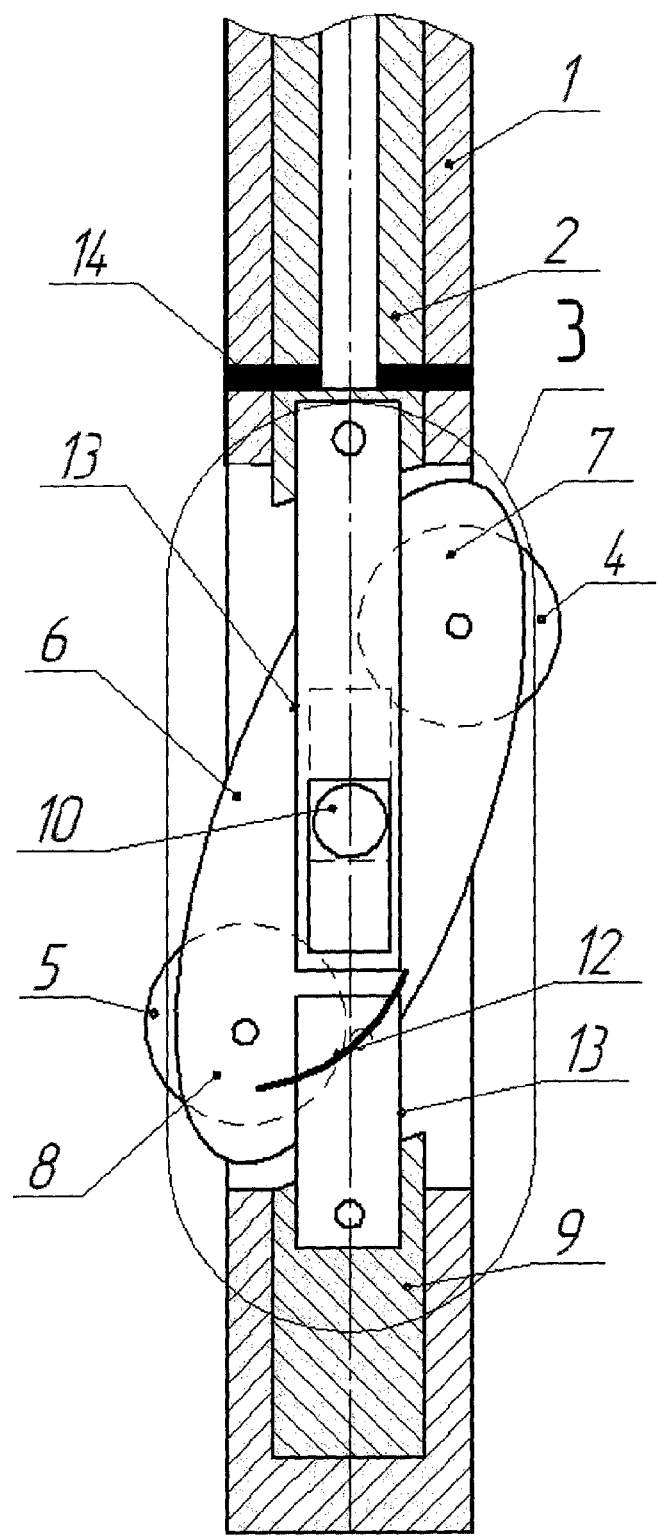
FIG. 1 illustrates the first embodiment of the invention with two cutting tools and a mechanism for their extension in the form of a balance beam.
Figure 2:
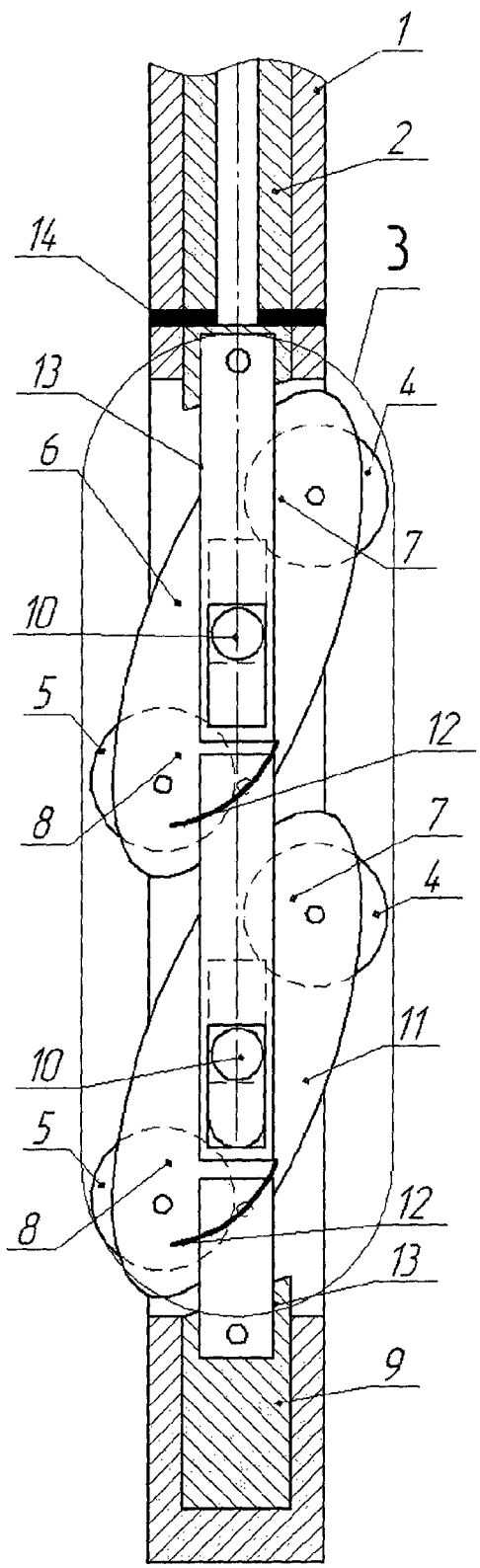
FIG. 2 illustrates the second embodiment of the invention with more than two cutting tools and the mechanism extending the cutting tools designed as a group of balance beams.

The hydro-mechanical slot perforator includes: a housing 1 containing a piston-pusher 2 and a cutting assembly 3 located below the piston 2, with the cutting assembly 3 comprising extendable cutting tools 4, 5 and a mechanism for their extending implemented as a double-arm lever (balance beam) 6, with its arms 7, 8 carrying the cutting tools, 4, 5, and a deflecting wedge 9 fixed under the balance beam 6, with the balance beam 6 mounted on a movable shaft 10 to rotate when the lower arm 8 interacts with the deflecting wedge 9 while the piston-pusher 2 moves down. The piston-pusher 2 is a wedge-shaped piston capable of acting directly on the upper arm 7 of the double-arm lever 6 when it slides out the upper cutting tool 4, and thus the wedge-piston 2 and the deflecting wedge 9 create more or less equal opposite forces acting simultaneously on the upper 7 and lower 8 arms of the balance beam 6.

The second embodiment of the hydro-mechanical slot perforator comprises a casing 1 containing a piston-pusher 2 and a cutting assembly 3 located below the piston 2, with the cutting assembly 3 comprising extendable cutting tools 4, 5 and a mechanism for their extending which includes a deflecting wedge 9 mounted in the perforator's casing 1 in a fixed manner under the cutting assembly 3. The piston-pusher 2 is a wedge-shaped piston capable of acting directly on the cutting assembly 3, which includes at least two balance beams 6, 11, housing in their arms 7, 8 the cutting tools 4, 5, with the balance beams 6, 11 mounted on mobile shafts 10 to interact and turn under the effect of the wedge-piston 2 acting on the upper arm 7 of the top balance beam 6 and the deflecting wedge 9 acting on the lower arm 8 of the bottom balance beam 11.

The perforator may contain a mechanism to bring the extendable-retractable parts into the transport position, for example, including one or more guiding grooves 12 implemented in the balance beam 6 (balance beams 6, 11), and one or more rods 13 attached to the other balance beam 11, to the shaft 10 of the other balance beam 11, to the piston-pusher 2, to the deflection wedge 9, configured to move along the groove (s) 12 providing thereby for the return of the balance beam 6 (balance beams 6, 11) into the transport position with the reverse movement of the piston-pusher 2.

The perforator can be fitted with two or more jet nozzles 14, mounted, for example, in the casing 1 and/or on the piston 2 of the perforator.

INDUSTRIAL APPLICABILITY

The device operates as follows. The perforator is lowered into the well on a tubing string, it is matched to the perforation range, and other preparatory work gets carried out in compliance with the familiar procedures. Then working pressure is created in the string resulting in the working fluid starting to act on the wedge-piston 2.

According to the first embodiment of the invention, the working fluid makes the piston 2 move along the axis of the device in the direction of the cutting assembly 3 and interact with the upper arm 7 of the double-arm lever (balance beam) 6, which bears the upper cutting disc 4, while the balance beam 6 under the effect of the wedge-piston 2 starts to move steadily on its movable shaft 10 along the device until its lower arm 8 touches the deflecting wedge 9. At the moment of its contact with the deflection wedge 9 the lower arm 8 of the balance beam 6 starts receiving the counter effort effected by the deflecting wedge 9. The simultaneous efforts of the wedge piston 2 from above and of the deflecting wedge 9 from below turn the balance beam 6, pushing the cutting tools 4, 5 into their operating position evenly.

In the second version of the proposed device the influence of the working fluid makes the piston 2 move along the axis of the device in the direction of the cutting assembly 3 and interact with the upper arm 7 of the upper double-arm lever (balance beam) 6, which bears the upper cutting disc 4, with the wedge piston 2 making the balance beam 6 move steadily on its mobile shaft 10 along the device until its lower arm 8 contacts the upper arm 7 of the bottom balance beam 11. Subsequently the bottom balance beam 11 under the influence of the top balance beam 6 moves likewise along the device on its mobile shaft 10 until it touches the deflecting wedge 9. At the moment of contact with the deflecting wedge 9 the lower arm 8 of the bottom balance beam 11 starts receiving the counter-effort from the deflecting wedge 9. The simultaneous efforts of the wedge piston 2 from above and of the deflection wedge 9 from below have the balance beams 6, 11 interact with each other pushing the cutting tools 4, 5 evenly into the operating position.

After bringing the cutting tools 4, 5 into the operating position the perforator is moved up and down along the axis of the string while constantly maintaining the working pressure in accordance with the applicable perforation technology. The pressure has the cutting tools 4, 5 penetrate into the walls of the column at the same time and with equal force to create in the said wall at least two longitudinal slots of the same quality. Upon having the column opened the jet nozzles 14 may be used to effect the jetting of the bottom-hole zone and destroy the cement sheath and the rocks past the column, creating cavities in the pay formation.

Upon completion of work in the perforation range the device is retracted into its transport position, for example, as follows: with the lowering of the operating pressure the piston 2 moves in reverse with its rod (s) 13 carrying along the top balance beam 6. At the same time the second rod 13 attached on one end to the deflecting wedge 9 and resting with its other end inside the groove 12 of the balance beam 6 rotates the balance beam 6 bringing it into the transport position. If the device contains more than one balance beam 6, 11, the bottom balance beams 11 get turned into the transport position by the rod(s) 13 attached to the top balance beams 6 or to their shafts 10, or vice versa, the top balance beams 6 are turned into the transport position by the rod(s) 13 attached to the bottom balance beams 11 or to their shafts 10. Moreover, the top balance beam 6 may be connected by the rod 13 to the piston 2, while the bottom balance beam 11 may be connected by the rod 13 to the deflecting wedge 9.

Both embodiments of the proposed device may also use other mechanisms for retracting the extendable parts into the transportation position.

Once in the transportation position, the device is withdrawn from the well or moved to a new perforation range to continue its job.

The invention claimed is:

1. A hydro-mechanical slot perforator device comprising:
a housing (1) enclosing a wedge-shaped piston (2) capable of reciprocating movement along an axis of said housing (1), and a cutting assembly (3) located below the piston (2);
wherein the cutting assembly (3) includes:
a balance beam (6) having an upper arm (7) and a lower arm (8), said balance beam (6) is pivotally mounted on a shaft (10) displaceable along said axis; wherein said upper arm (7) is pressed by said piston (2) when the piston (2) moves downward, thereby causing a downward displacement of the shaft (10);
extendable cutting tools (4) and (5) mounted respectively on the upper arm (7) and on the lower arm (8); and
a deflecting wedge (9) mounted below the balance beam (6) and fixed in relation to said housing (1);
wherein, when said piston (2) and said shaft (10) move downward, said lower arm (8) is pressed by said shaft (10) downward and by said deflecting wedge (9) upward, thereby extending said cutting tools (4) and (5) in opposite directions substantially transversely to said axis into operating positions.

2. The hydro-mechanical slot perforator device according to claim 1, further comprising a mechanism for retracting the extendable cutting tools (4) and (5) into a transport position; said mechanism includes:
at least one guiding groove (12) arranged on the balance beam (6),
at least one first rod (13) attached to the piston (2), and
at least one second rod (13) attached to the deflecting wedge (9), said second rod (13) has a top end;
wherein said guiding groove (12) is configured to move along said top end and to secure the balance beam (6) in the transport position when the piston (2) moves upward.

3. The hydro-mechanical slot perforator device according to claim 1, further equipped with at least two jet nozzles (14) mounted in the housing (1) and/or in the piston (2).

4. A hydro-mechanical slot perforator device comprising:
a housing (1) enclosing a wedge-shaped piston (2) capable of reciprocating movement along an axis of said housing (1), and a cutting assembly (3) located below the piston (2);
wherein the cutting assembly (3) includes:
a first balance beam (6) pivotally mounted on a first shaft (10) displaceable along said axis; said balance beam (6) having: a first upper arm (7) and a first lower arm (8), a first extendable cutting tool (4) and a first extendable cutting tool (5) mounted respectively on the first upper arm (7) and on the first lower arm (8); wherein said first upper arm (7) is pressed by said piston (2) when the piston (2) moves downward thereby causing a downward displacement of the first shaft (10);
a second balance beam (11) pivotally mounted on a second shaft (10) displaceable along said axis; said balance beam (11) having a second upper arm (7) and a second lower arm (8), a second extendable cutting tool (4) and a second extendable cutting tool (5) mounted respectively on the second upper arm (7) and on the second lower arm (8); wherein said first lower arm (8) is pressed by said second upper arm (7) when the piston (2) moves downward thereby causing a downward displacement of the second shaft (10); and
a deflecting wedge (9) mounted below the second balance beam (11) and fixed in relation to said housing (1);

wherein, when said piston (2) and said shafts (10) move downward: said first lower arm (8) is pressed by said first shaft (10) downward and by said second upper arm (7) upward, thereby extending said first cutting tools (4) and (5) in opposite directions substantially transversely to said axis into operating positions; and said second lower arm (8), is pressed by said second shaft (10) downward and by the deflecting wedge (9) upward, thereby extending said second cutting tools (4) and (5) in opposite directions substantially transversely to said axis into operating positions.

5. The hydro-mechanical slot perforator device according to claim 4, further comprising a mechanism for retracting the first extendable cutting tools (4) and (5) and the second extendable cutting tools (4) and (5) into a transport position; said mechanism includes:

- at least one first guiding groove (12) arranged on the first balance beam (6);
- at least one second guiding groove (12) arranged on the second balance beam (11);
- at least one upper rod (13) having a top end fixedly attached to the piston (2) and a bottom end slidably associated with the first shaft (10);
- at least one middle rod (13) having a bottom end slidably associated with the second shaft (10) and a top end configured to move along said first guiding groove (12) thereby securing the first balance beam (6) in the transport position when the piston (2) moves upward; and
- at least one lower rod (13) having a bottom end fixedly attached to the deflecting wedge (9) and a top end, wherein said second guiding groove (12) is configured to move along said top end of the lower rod (13), thereby securing the second balance beam (11) in the transport position when the piston (2) moves upward.

6. The hydro-mechanical slot perforator according to claim 4, further equipped with at least two jet nozzles (14) mounted in the housing (1) and/or in the piston (2).

* * * * *